United States Patent
Chan (10) Patent No.: US 8,050,285 B2
(45) Date of Patent: Nov. 1, 2011

(54) HIGH SPEED POWER LINE NETWORK CONNECTOR AND METHOD FOR POWER LINE NETWORKING

(75) Inventor: Tat Keung Chan, South San Francisco, CA (US)

(73) Assignee: Asoka USA Corporation, Santa Clara, CA (US)

( * ) Notice: Subject to any disclaimer, the term of this patent is extended or adjusted under 35 U.S.C. 154(b) by 854 days.

(21) Appl. No.: 11/845,019

(22) Filed: Aug. 24, 2007

(65) Prior Publication Data

US 2008/0205450 A1    Aug. 28, 2008

Related U.S. Application Data

(60) Provisional application No. 60/824,000, filed on Aug. 30, 2006.

(51) Int. Cl.
*H04L 12/56* (2006.01)
(52) U.S. Cl. ........................................ 370/419
(58) Field of Classification Search .......... 370/419, 370/420, 401, 252, 464, 463
See application file for complete search history.

(56) References Cited

U.S. PATENT DOCUMENTS

| | | | |
|---|---|---|---|
| 6,130,896 A * | 10/2000 | Lueker et al. | 370/469 |
| 7,016,368 B2 | 3/2006 | Binder | |
| 7,035,280 B2 | 4/2006 | Binder | |
| 7,095,756 B2 | 8/2006 | Binder | |
| 2003/0227373 A1 * | 12/2003 | Lou et al. | 340/310.01 |
| 2005/0111560 A1 * | 5/2005 | Haines | 375/257 |
| 2010/0145531 A1 * | 6/2010 | Nickerson et al. | 700/284 |

* cited by examiner

*Primary Examiner* — Man Phan
*Assistant Examiner* — Nourali Mansoury
(74) *Attorney, Agent, or Firm* — Baker Botts L.L.P.

(57) ABSTRACT

A power line module and method. In a preferred embodiment, the power line module is adapted to couple to a power line outlet, which is provided on a power line network within a spatial region. A power line chip is within a housing. In a preferred embodiment. the power line chip has an input/output port and is capable of converting a power line telecommunication signal having a data rate of greater than about 80 Megabits per second from the power line network to an Ethernet signal for use in a local area network segment. The module has a coupling device coupled to the input/output port of the power line chip. In a preferred embodiment, the module has a first pin comprising a plurality of first spring members operably coupled the coupling device. The first pin is insertable into a first site of the power outlet. The module has a second pin comprising a plurality of second spring members operably coupled to the coupling device.

21 Claims, 8 Drawing Sheets

HIGH SPEED POWER LINE NETWORK CONNECTOR AND METHOD FOR POWER LINE NETWORKING

CROSS-REFERENCES TO RELATED APPLICATIONS

This application claims priority to U.S. Provisional Application No. 60/824,000, filed Aug. 30, 2006, which is incorporated by reference herein.

BACKGROUND OF THE INVENTION

The present invention relates generally to power line networking techniques. More particularly, the invention provides a method and system for a high speed power line network using a connector method and device of a determined resistance and less. Merely by way of example, the invention has been applied in a local area network environment, but it would be recognized that other applications exist. The invention can also be applied to building area networking, home networking, office networking, apartments, any combination of these, and other networking applications.

Telecommunication techniques have been around for numerous years. In the early days, a communication technique known as telegraph was developed. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network or other communication network. These computers or workstations coupled to each other can transmit many types of information from one geographical location to another geographical location. In general, there has been various types of computer networks, including local area networks, commonly called LANs, and wide are networks, commonly called WANs.

Local area networks have been used to connect computers in a smaller geographic region than wide area networks. Most local area networks rely upon dedicated cables to transmit the communication signals through the network. An alternative way of transmitting such communication signals through non-dedicated cables but through a power supply network is referred to as Power line Communication, commonly called PLC. Power line communication relies upon pre-existing power lines that are used to supply electrical power distributed through buildings, such as homes and office structures. Conventional PLC relies upon radio frequency technologies. Although power line communications have been successful in part, many limitations still exist.

For example, power line communication generally has poor physical connections. That is, network connections often occur using conventional AC outlines and power plugs, which have certain resistances. Such resistances often cause data loss, and other network communication problems. As network communication speeds increase, it becomes more and more difficult to provide proper connectivity using conventional AC outlets and power plugs. These and other limitations have been described throughout the present specification and more particularly below.

From the above, it is seen that improved techniques for power line networks are highly desired.

BRIEF SUMMARY OF THE INVENTION

According to the present invention, techniques for power line networking techniques are provided. More particularly, the invention provides a method and system for a high speed power line network using a connector method and device of a determined resistance and less. Merely by way of example, the invention has been applied in a local area network environment, but it would be recognized that other applications exist. The invention can also be applied to building area networking, home networking, office networking, apartments, any combination of these, and other networking applications.

In a specific embodiment, the present invention provides a power line module. In a preferred embodiment, the power line module is adapted to couple to a power line outlet, which is provided on a power line network within a spatial region. The power line module has a housing, which has a length of less than 12 inches, a width of less than 6 inches, and a width of less than 6 inches. A power line chip is within the housing. In a preferred embodiment. the power line chip has an input/output port and is capable of converting a power line telecommunication signal having a data rate of greater than about 80 Megabits per second from the power line network to an Ethernet signal for use in a local area network segment. The module has a coupling device coupled to the input/output port of the power line chip. In a preferred embodiment, the module has a first pin comprising a plurality of first spring members operably coupled the coupling device. The first pin is insertable into a first site of the power outlet. The module has a second pin comprising a plurality of second spring members operably coupled to the coupling device. The second pin is insertable into a second site of the power outlet. In a preferred embodiment, a first resistance of less than about first predetermined amount is between the first pin and the first site. A second resistance of less than about second predetermined amount is between the second pin and the second site.

In an alternative specific embodiment, the present invention provides a power line gateway device. The device has a housing. The device has a power line module within a spatial region of the housing. In a preferred embodiment, the power line module has an input/output port. The gateway device has a coupling device coupled to the input/output port. The gateway also has a first pin comprising a plurality of first spring members operably coupled the coupling device. In a preferred embodiment, the first pin is insertable into a first site of a power outlet. The gateway device has a second pin comprising a plurality of second spring members operably coupled to the coupling device. In a preferred embodiment, the second pin is insertable into a second site of the power outlet. The device has a first resistance of less than about first predetermined amount between the first pin and the first site and a second resistance of less than about second predetermined amount between the second pin and the second site.

In yet an alternative embodiment, the present invention provides a method for power line networking. The method includes transferring one or more power line signals having a bit rate of greater than about 80 Megabits per second over a coupling device. The method also includes transferring the one or more power line signals greater than about 80 Megabits per second from the coupling device to over at least one pin comprising a plurality of spring members and over a power plug site to a power line network. In a preferred embodiment, the one pin includes the plurality of spring members being inserted into the power plug site such that an electrical resistance between the pin and the site is less than about a predetermined amount.

In a specific embodiment, the power plug includes a plurality of spring members characterized by a resistance of less than about a determined amount to reduce high a high frequency noise of about 1 Mega Hertz and greater to allow for network traffic to be able to flow at a speed of about 80 Mega bits per second and greater. In a preferred embodiment, the determined resistance does not fluctuate and is substantially maintained over a long time period or a time period associated with the network traffic. Of course, there can be other variations, modifications, and alternatives.

Numerous benefits are achieved using the present invention over conventional techniques. The present invention can be applied using conventional components from computer networking and hardware technologies. Additionally, the invention can be applied to pre-existing power line structures without substantial modification. Preferably, the present system and method are easy to implement and also selectively connect and depending upon the user. In preferred embodiments, the invention also provides for improved connectivity for high data rate transmission of up to 80 Mega bits per second and greater without loss in data. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for power line networking techniques are provided. More particularly, the invention provides a method and system for a high speed power line network using a connector method and device of a determined resistance and less. Merely by way of example, the invention has been applied in a local area network environment, but it would be recognized that other applications exist. The invention can also be applied to building area networking, home networking, office networking, apartments, any combination of these, and other networking applications.

Figure 1:
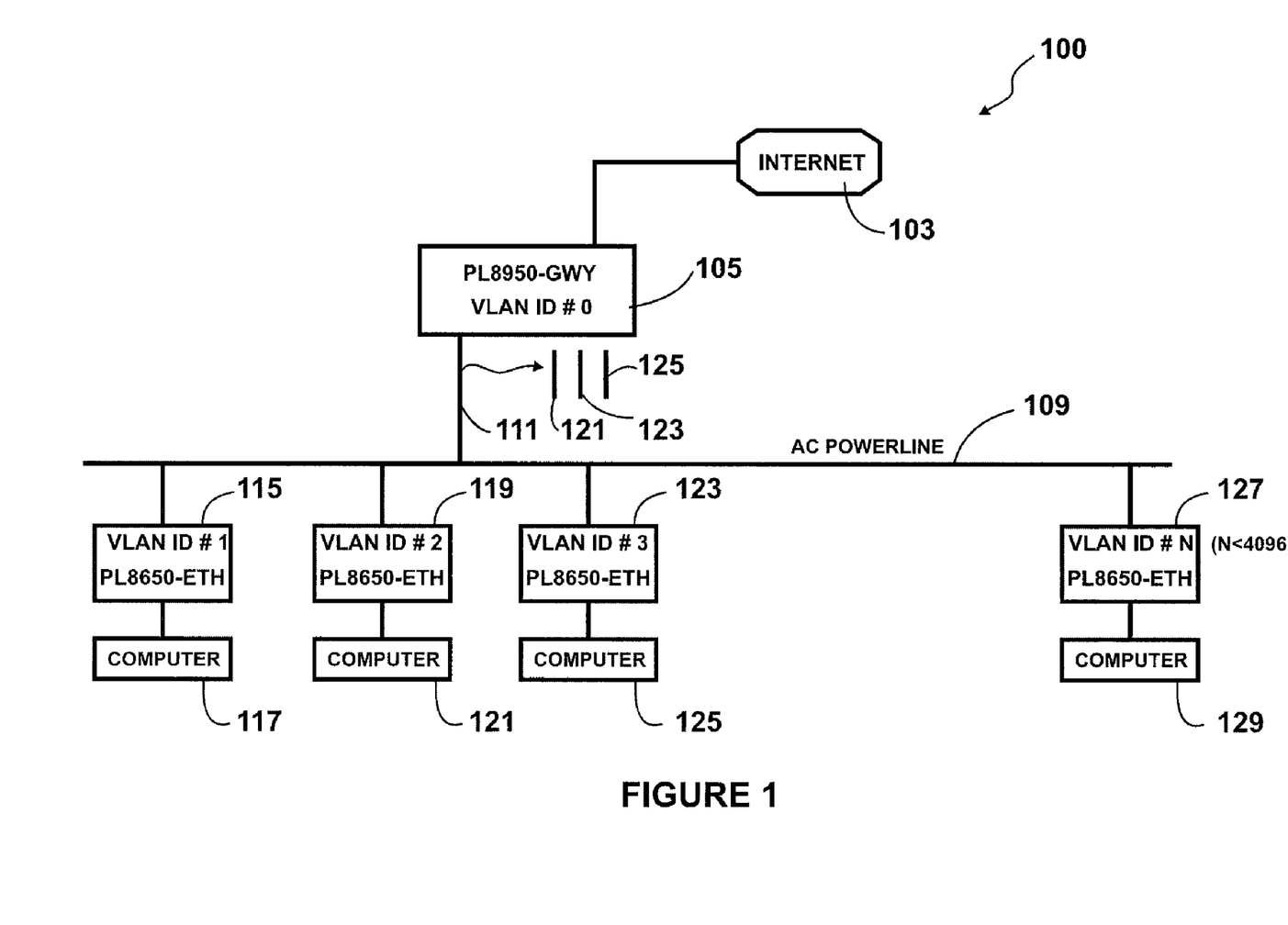
FIG. 1 is a simplified diagram of a power line system according to an embodiment of the present invention.

FIG. 1 is a simplified diagram of a power line system according to an embodiment of the present invention. This diagram is merely an example, which should not unduly limit the scope of the claims herein. One of ordinary skill in the art would recognize many variations, alternatives, and modifications. As shown, the system 100 for power line networking is included. The system 100 has an external data source 103, which is derived from a world wide networks of computers. As merely an example, the data source can be the Internet or other like entity. The system includes a first power line 121, a second power line 123, and a third power line 125, each of which corresponds to a phase. Each of the power lines is often bundled together and represented by reference numeral 111.

Referring again to FIG. 1, the system includes a gateway 115 coupled between the data source and an AC power line 109 according to a specific embodiment. The AC power line couples to a plurality of bridge devices 115, 119, 123, 127 numbered from 1 through N, where N is an integer greater than 2, according to a specific embodiment. Each of the bridge devices is coupled to a client device 117 or a plurality of client devices to define a "segment" on the power line network. As shown, bridge device 119 couples to client device 121. Bridge device 123 couples to client device 125. Bridge device 127 couples to client device 129. Depending upon the specific embodiment, the client device can be a personal computer, a wireless device, a lap top computer, an Internet phone, an Internet appliance (e.g., refrigerator, stereo, television set, clock), any combinations of these, and others. Of course, one of ordinary skill in the art would recognize. Further details of the gateway and bridge device can be found throughout the present specification and more particularly below.

Figure 2:
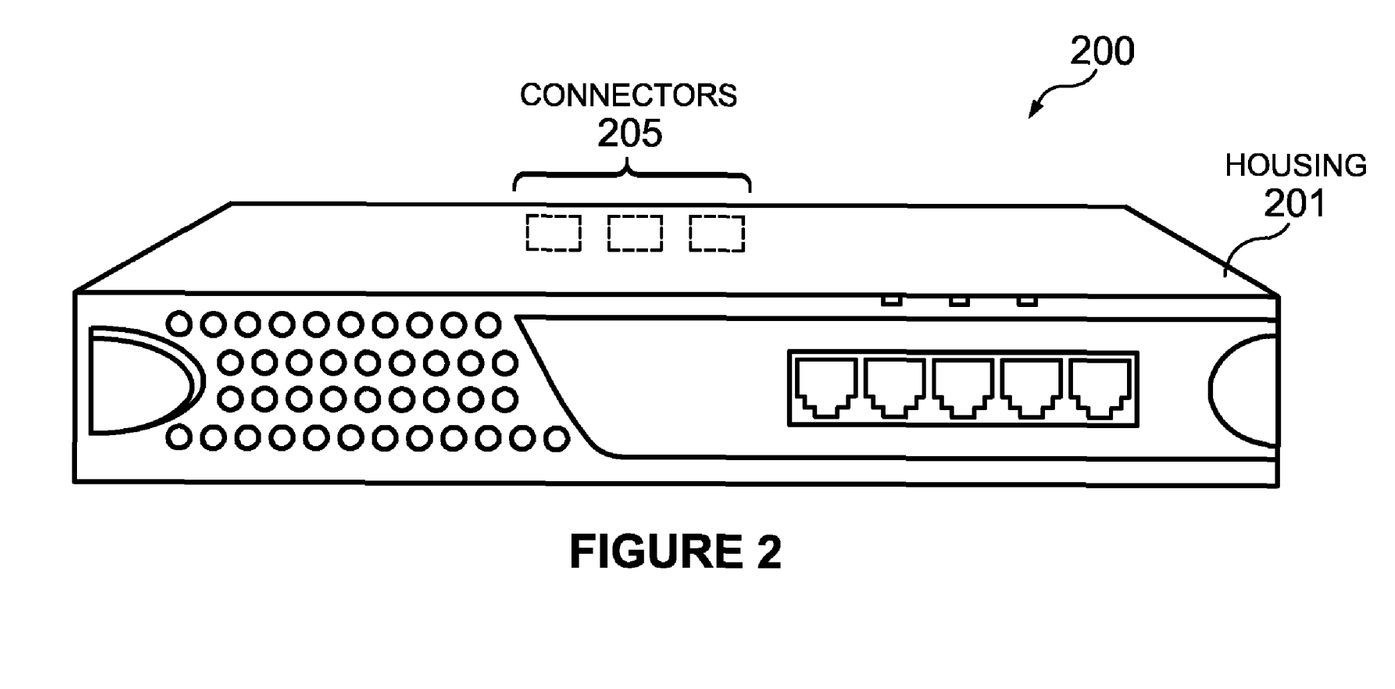
FIG. 2 is a simplified diagram of a power line gateway system according to an embodiment of the present invention.

FIG. 2 is a simplified diagram of a power line gateway system 200 according to an embodiment of the present invention. This diagram is merely an example, which should not unduly limit the scope of the claims herein. One of ordinary skill in the art would recognize many variations, alternatives, and modifications. As shown, the gateway system 200 has a housing 201 including at least three input/output ports 205, which can be coupled to external power lines according to a specific embodiment. The housing also has a length of about 12 inches to about 5 inches and a width of about width of about 6 inches to about 2 inches, and a thickness of less than about 2 inches and less according to a specific embodiment. The housing is also made of a suitable material such as plastic and can be provided in a rack or other suitable location according to a specific embodiment. In a specific embodiment, one or more power line signals is derived from the housing.

In a preferred embodiment, the power line signal coupled to each of the three input/output ports. That is, the power line signal is injected directly into each of the phases. In a specific embodiment, the present power line signal is injected directly into each of the phases, where the phases are not coupled to each other upon injection according to a specific embodiment. The three input/output ports include a first phase input/output port coupled to the first power line, a second phase input/output port coupled to the second power line, and a third input/output port coupled to the third power line. Of course, there can be other variations, modifications, and alternatives. Further details of the gateway system can be found throughout the present specification and more particularly below.

Figure 3:
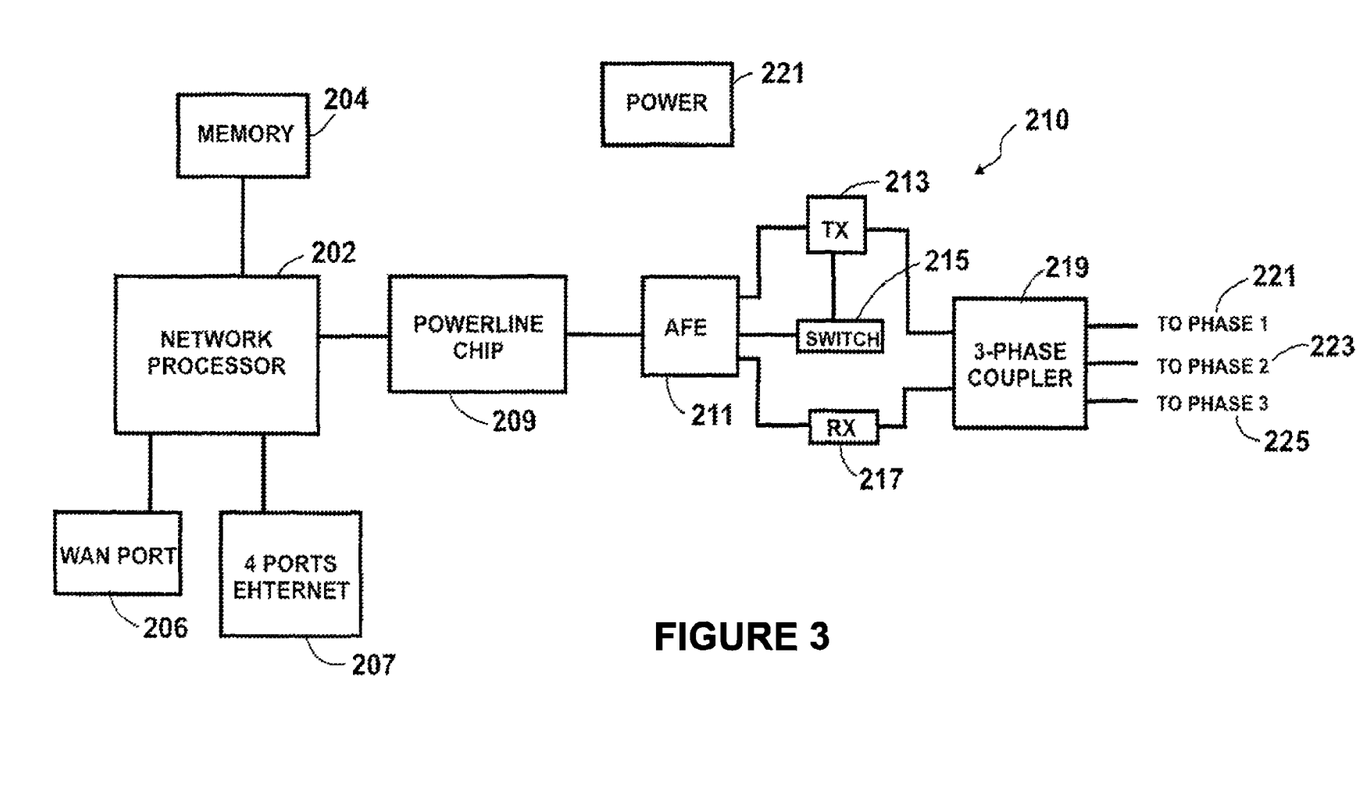
FIG. 3 is a simplified block diagram of the power line gateway system of FIG. 2 according to a specific embodiment of the present invention.

FIG. 3 is a simplified block diagram 210 of the power line gateway system of FIG. 2 according to a specific embodiment. This diagram is merely an example, which should not unduly limit the scope of the claims herein. One of ordinary skill in the art would recognize many variations, alternatives, and modifications. As shown, the system has a network processor 202 within the housing and coupled to the power line signal via power line chip 209. In a specific embodiment, the network processor includes a network connector input/output port 206 coupled the network processor and coupled to the housing. In a preferred embodiment, the input/output port 206 couples to a data network, which couples to a wide area network and/or world wide area network, as noted. The network processor also includes one or more input/output ports for one or more local area networks 207. The network processor has an interface to a memory device 204, which can include a dynamic random access memory, static random access memory, or other types, depending upon the specific embodiment. As merely an example, the network processor can be any suitable type such as the ADM5120 Series manufactured by Infineon Technologies AG of Germany, but can also be others. In a specific embodiment, the system also has a power module 221, which provides suitable power (e.g., voltage/current) to each of the elements described herein. Of course, one of ordinary skill in the art would recognize other variations, modifications, and alternatives.

In a preferred embodiment, the system has the power line chip 209, called herein "PLC" chip, which is coupled between the network processor and analog front end 211 device. As shown, the PLC is coupled to the analog front end (AFE) module 211. The AFE module interfaces between the chipset and a three phase coupler 219 according to a specific embodiment. Between the AFE and coupler is transmit 213 and receive 217 devices according to a specific embodiment. A switching device couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the three phase coupler can be any suitable device capable of injecting power line signals directly into each of the three phases 221, 223, 225 independently. In a specific embodiment, the coupler can be an inductive coupler and/or capacitive coupler, but may be others. In a preferred embodiment, each of the three phases receives/transmits power line signals directly (and are not coupled to each other at the gateway or within a vicinity of the gateway) to more efficient signal transfer and receive processes. As merely an example, the coupler (either inductive and/or capacitive coupler) can be a coupler product sold by INTELLON Corporation, but can be others. As noted, the three phase coupler is merely an example and should not unduly limit the scope of the claims herein.

Figure 3A:
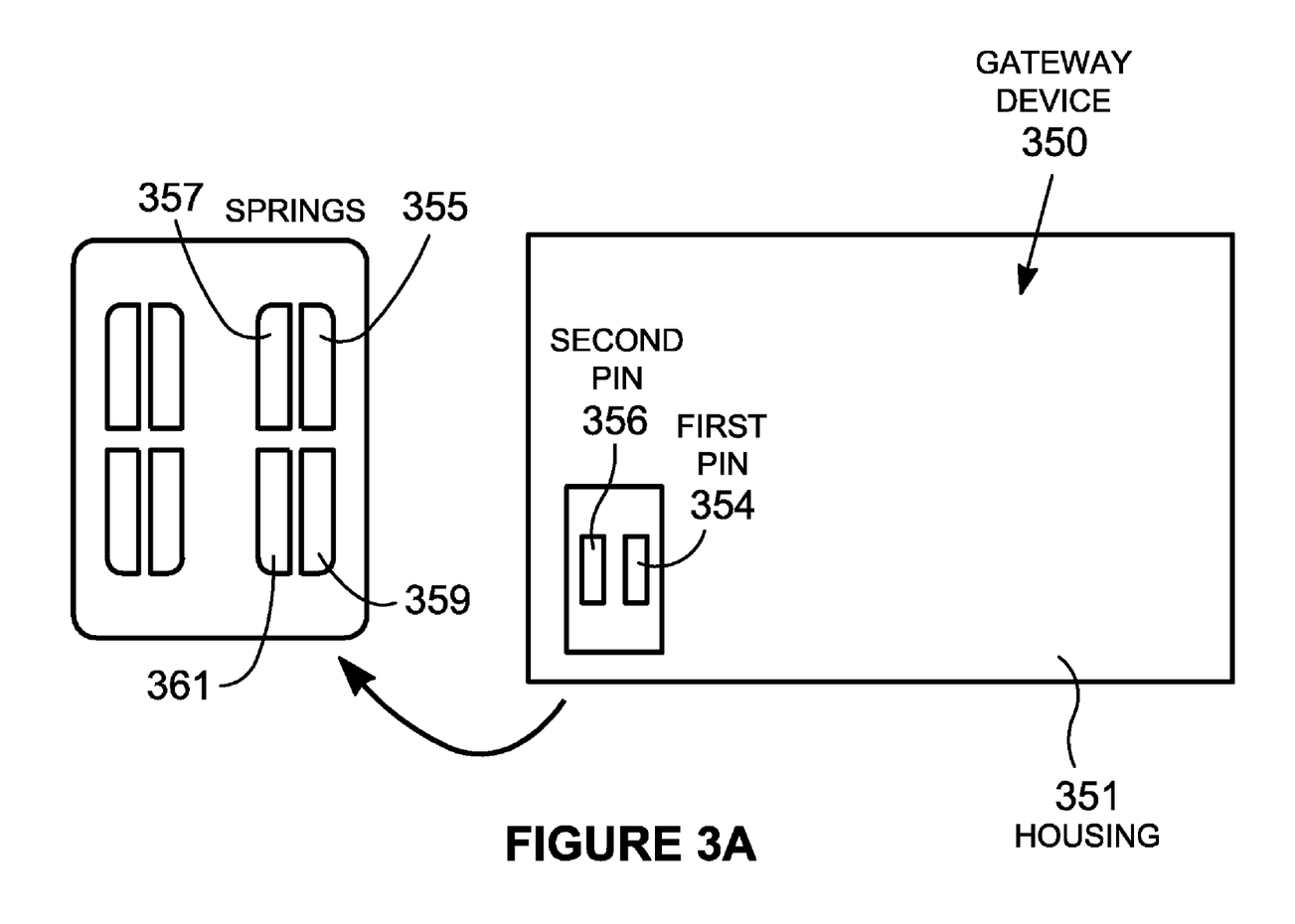
FIG. 3A is a simplified diagram of a power line connector for the gateway system of FIG. 2 according to an embodiment of the present invention.

FIG. 3A is a simplified diagram of a power line connector 350 for the gateway system of FIG. 2 according to an embodiment of the present invention. This diagram is merely an example, which should not unduly limit the scope of the claims herein. One of ordinary skill in the art would recognize many variations, alternatives, and modifications. As shown, the power line gateway device 350 is provided. The device has a housing 351. The device has a power line module (not shown) within a spatial region of the housing. In a preferred embodiment, the power line module has an input/output port. The gateway device has a coupling device, which was described above, coupled to the input/output port. The gateway device also includes other elements, which have been described herein as well as outside of the present specification.

In a specific embodiment, the gateway also has a first pin 354 comprising a plurality of first spring members 355, 357, 359, 361 operably coupled the coupling device. In a preferred embodiment, the first pin is insertable into a first site of a power outlet. The gateway device has a second pin 356 comprising a plurality of second spring members operably coupled to the coupling device. In a preferred embodiment, the second pin is insertable into a second site of the power outlet. The device has a first resistance of less than about a predetermined amount between the first pin and the first site and a second resistance of less than about a predetermined amount between the second pin and the second site. In a specific embodiment, the plurality of spring members comprise at least two spring members or at least three spring members or at least four spring members, depending upon the specific application. Of course, there can be other variations, modifications, and alternatives.

In a specific embodiment, the pins are made of a suitable material. The suitable material is strong, can flex, and has substantially no oxidation thereon. The suitable material can be a spring steel, such as stainless, coated spring steel, or others. Additionally, the suitable material must often have good electrical conductivity, which ranges from about a suitable amount and greater. Of course, there can be other variations, modifications, and alternatives.

In a preferred embodiment, electrical contact between each of the pins and power outlet is suitable to reduce parasitic noise. That is, the electrical resistance of less than a predetermined amount between the pin and power outlet reduces a high frequency of 1 Mega Hertz and greater when transmitting power line communication signals having a rate of about 80 Mega bits and greater or 200 Mega bits and greater according to a specific embodiment. Of course, there can be other variations, modifications, and alternatives.

Figure 4:
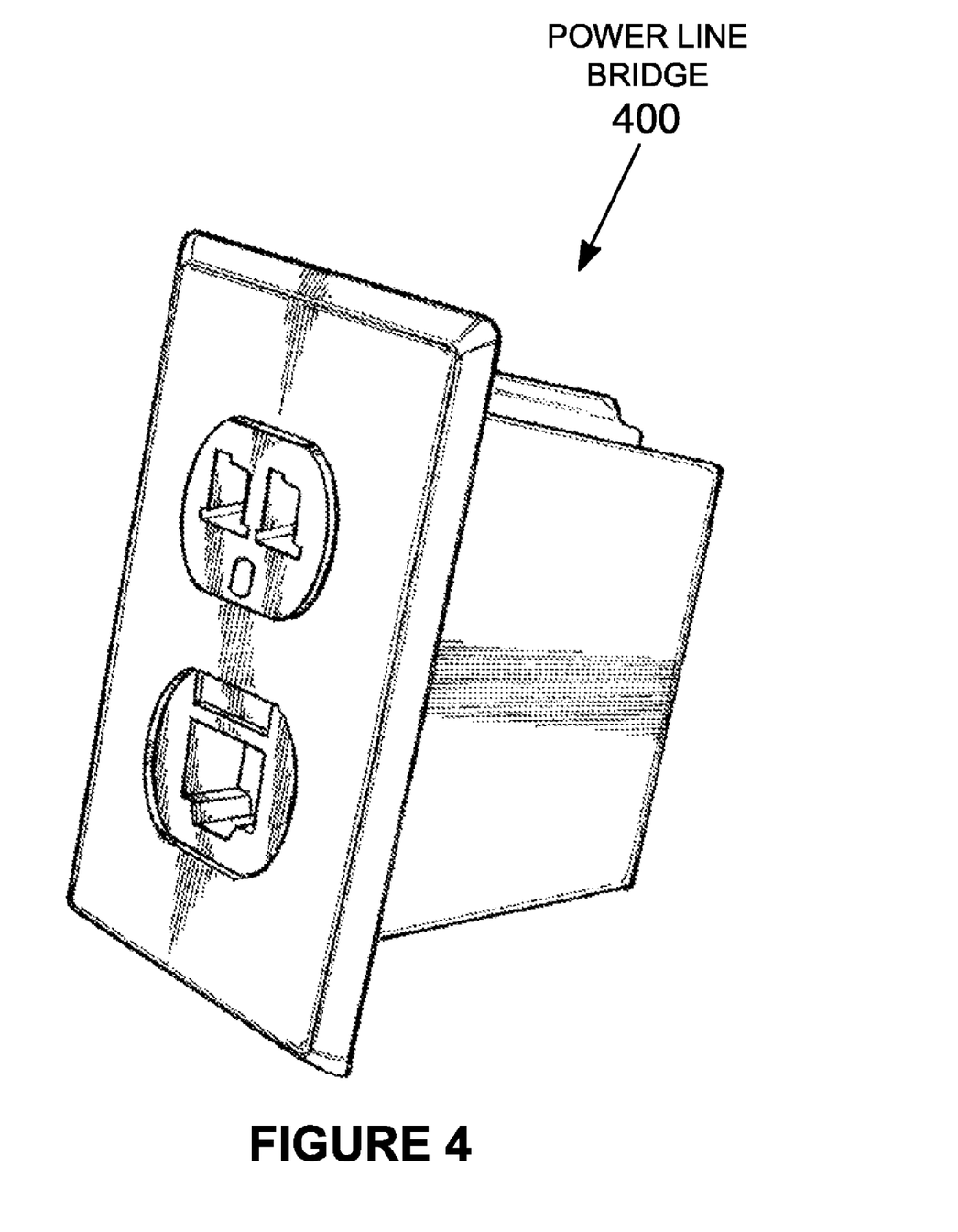
FIG. 4 is a simplified diagram of a power line bridge according to an embodiment of the present invention.

FIG. 4 is a simplified diagram of a power line bridge 400 according to an embodiment of the present invention. This diagram is merely an example, which should not unduly limit the scope of the claims herein. One of ordinary skill in the art would recognize many variations, alternatives, and modifications. As shown, the bridge device can be provided in housing 400, which is adapted to a wall or other like structure according to a specific embodiment. Further details of the housing can be found throughout the present specification and also be found in "Method and System for Virtual Power line Local Area Networks," in the names of Tat Keung Chan and Songly Mu listed under U.S. Ser. No. 10/712,748 filed Nov. 12, 2003, commonly assigned, and hereby incorporated by reference for all purposes.

Figure 4A:
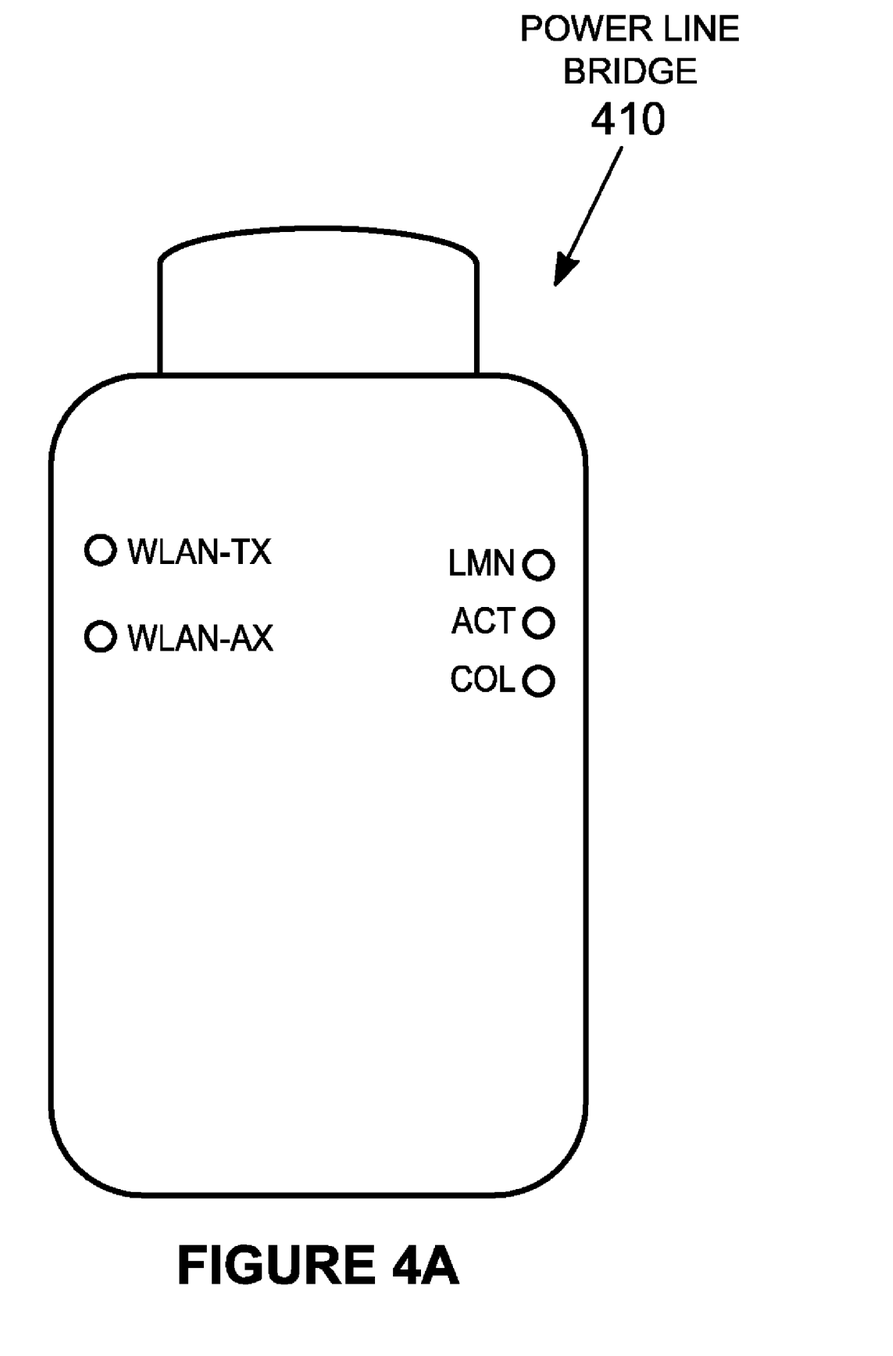
FIG. 4A is a simplified diagram of a power line bridge according to an alternative embodiment of the present invention.

FIG. 4A is a simplified diagram of a power line bridge 410 according to an alternative embodiment of the present invention. This diagram is merely an example, which should not unduly limit the scope of the claims herein. One of ordinary skill in the art would recognize many variations, alternatives, and modifications. As shown, the bridge device can be provided in housing 410, which is removable and usable with an AC outlet capable of power line networking, according to a specific embodiment. Further details of the removable housing can be found throughout the present specification and also be found in "Method and System for Virtual Power line Local Area Networks," in the names of Tat Keung Chan and Songly Mu listed under U.S. Ser. No. 10/712,748 filed Nov. 12, 2003, commonly assigned, and hereby incorporated by reference for all purposes. Additionally, further details of the elements provided within the housing are described throughout the present specification and more particularly below.

Figure 4B:
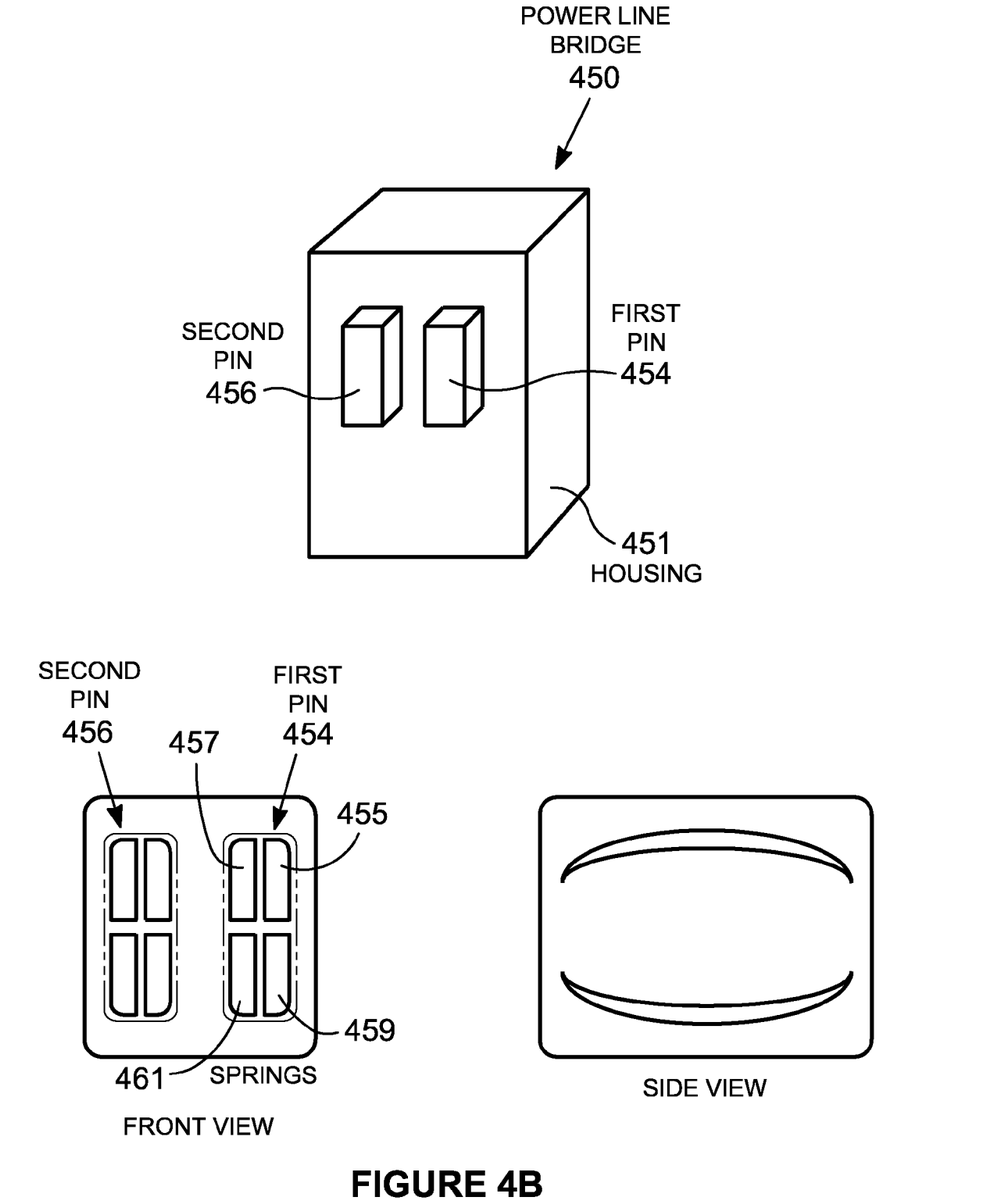
FIG. 4B is a simplified diagram of a power line connector for the power line bridge of FIGS. 4 and 4A according to an embodiment of the present invention.

FIG. 4B is a simplified diagram of a power line connector for the power line bridge of FIGS. 4 and 4A according to an embodiment of the present invention. This diagram is merely an example, which should not unduly limit the scope of the claims herein. One of ordinary skill in the art would recognize many variations, alternatives, and modifications. As shown, the power line bridge 450 is provided. The bridge device has a housing 451. The bridge device has a power line module (not shown) within a spatial region of the housing. In a preferred embodiment, the power line module has an input/output port. The bridge device has a coupling device, which was described above, coupled to the input/output port. The bridge device also includes other elements, which have been described herein as well as outside of the present specification.

In a specific embodiment, the bridge device also has a first pin 454 comprising a plurality of first spring members 455, 457, 459, 461 operably coupled the coupling device. As shown, a front-view and side-view of the pin are illustrated. In a preferred embodiment, the first pin is insertable into a first site of a power outlet. The device has a second pin 456 comprising a plurality of second spring members operably coupled to the coupling device. In a preferred embodiment, the second pin is insertable into a second site of the power outlet. The device has a first resistance of less than about a determined amount between the first pin and the first site and a second resistance of less than about a determined amount between the second pin and the second site. In a specific embodiment, the plurality of spring members comprise at least two spring members or at least three spring members or at least four spring members, depending upon the specific application. Of course, there can be other variations, modifications, and alternatives.

In a specific embodiment, the pins are made of a suitable material. The suitable material is strong, can flex, and has substantially no oxidation thereon. The suitable material can be a spring steel, such as stainless or others. Additionally, the suitable material must often have good electrical conductivity, which ranges from about a determined amount and greater. Of course, there can be other variations, modifications, and alternatives.

In a preferred embodiment, electrical contact between each of the pins and power outlet is suitable to reduce parasitic noise. That is, the electrical resistance of less than a determined amount between the pin and power outlet reduces a high frequency of 1 Mega Hertz and greater when transmitting power line communication signals having a rate of about 80 Mega bits and greater or 200 Mega bits and greater according to a specific embodiment. Of course, there can be other variations, modifications, and alternatives.

Figure 5:
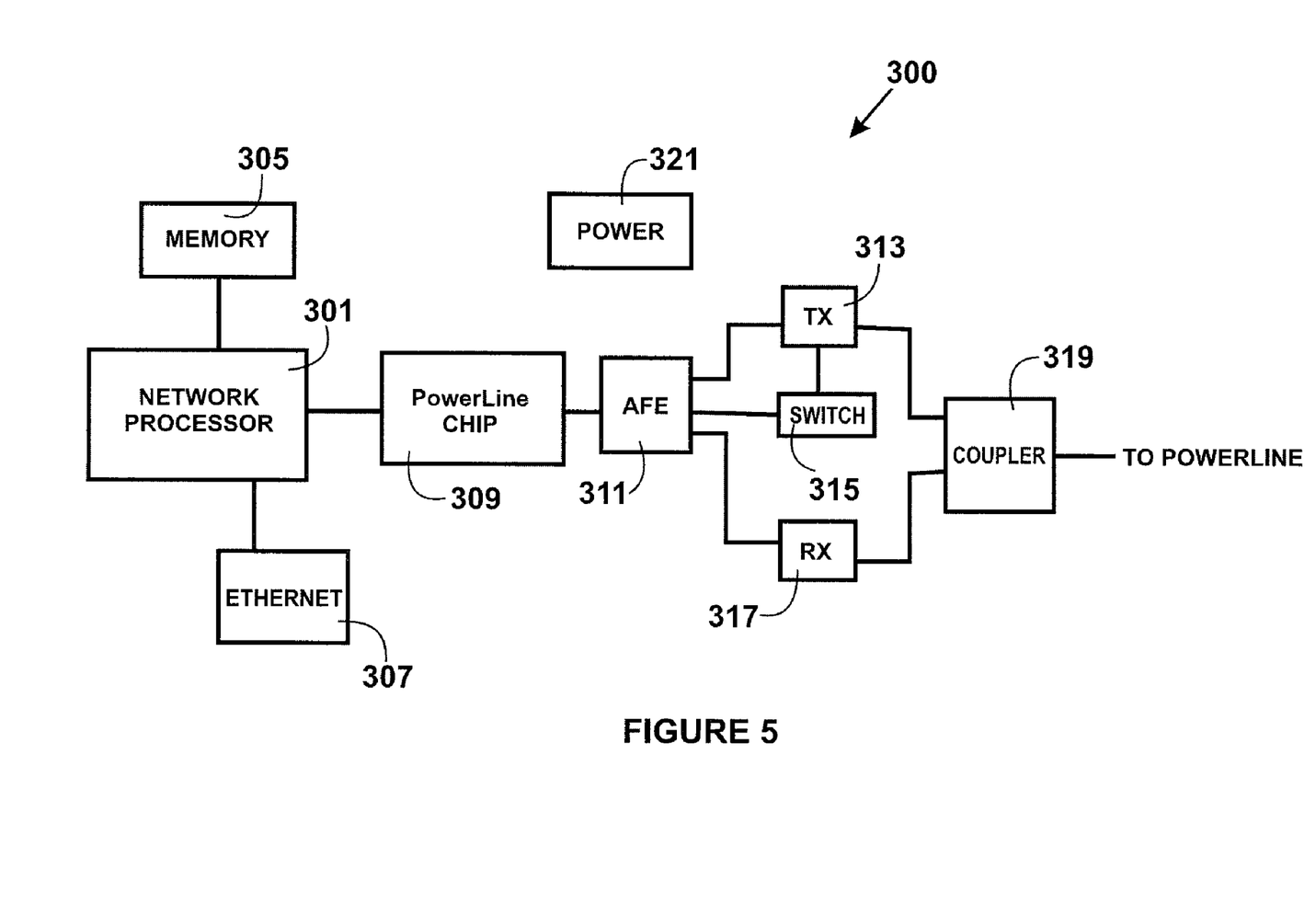
FIG. 5 is a simplified block diagram of a power line bridge according to an embodiment of the present invention.

FIG. 5 is a simplified block diagram of a power line bridge 300 according to an embodiment of the present invention. This diagram is merely an example, which should not unduly limit the scope of the claims herein. One of ordinary skill in the art would recognize many variations, alternatives, and modifications. As shown, the system has a network processor 301 within the housing and coupled to the power line signal via power line chip 309. In a specific embodiment, the network processor includes The network processor includes one or more input/output ports for one or more local area networks 307. In a specific embodiment, the local area network can be Ethernet and/or other like technology. The network processor has an interface to a memory device 305, which can include a dynamic random access memory, static random access memory, or other types, depending upon the specific embodiment. As merely an example, the network processor can be any suitable type such as the ADM5120 Series manufactured by Infineon Technologies AG of Germany, but can also be others. In a specific embodiment, the system also has a power module 309, which provides suitable power (e.g., voltage/current) to each of the elements described herein. Of course, one of ordinary skill in the art would recognize other variations, modifications, and alternatives.

In a preferred embodiment, the system has the power line chip 309, called herein "PLC" chip, which is coupled between the network processor and an analog front end 311 device. As shown, the PLC is coupled to the analog front end (AFE) device and/or module 311. The AFE module interfaces between the PLC chip and a phase coupler 319 according to a specific embodiment. Between the AFE and coupler is transmit 313 and receive 317 devices according to a specific embodiment. A switching device 315 couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the coupler 319 can be any suitable device capable of injecting and/or receiving power line signals to and/from a power line, which is coupled to a power line network. In a specific embodiment, the coupler can be an inductive coupler and/or capacitive coupler, but may be others. As merely an example, the coupler (either inductive and/or capacitive coupler) can be a product sold by INTELLON Corporation, but can be others. As noted, the three phase coupler is merely an example and should not unduly limit the scope of the claims herein.

In a specific embodiment, the power line network can include more than one network bridge, which provide for respective local area networking segments. Each of these segments can be controlled independently via network processing device according to a specific embodiment. The present power line network system can include a first network bridge coupled to one or more first client devices to form a first network segment according to a specific embodiment. The present power line network system can include a second network bridge coupled to one or more second client devices to form a second network segment according to a specific embodiment. The present power line network system can include a third network bridge coupled to one or more third client devices to form a third network segment according to a specific embodiment. The present power line network system can include an Nth network bridge coupled to one or more Nth client devices to form an Nth network segment according to a specific embodiment. As noted, the present power line network can be scaled to the Nth segment according to a preferred embodiment. Of course, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A power line module, the power line module being coupled to a power line outlet, the power line outlet being provided on a power line network within a spatial region, the power line module comprising:
    a housing;
    a power line chip within the housing, the power line chip having an input/output port, the power line chip converting a power line telecommunication signal having a bit rate of greater than about 80 Megabits per second from the power line network to an Ethernet signal for use in a local area network segment;
    a coupling device operably coupled to the input/output port of the power line chip;
    a first pin comprising a plurality of first spring members operably coupled to the coupling device, the first pin being insertable into a first site of the power outlet;
    a second pin comprising a plurality of second spring members operably coupled to the coupling device, the second pin being insertable into a second site of the power outlet;
    a first resistance of less than about a first determined amount between the first pin and the first site for reducing noise; and
    a second resistance of less than about a second determined amount between the second pin and the second site for reducing noise.

2. The power line module of claim 1 wherein the plurality of first spring members comprise four spring members configured within a first center region; wherein the plurality of second spring members comprise four spring members configured within a second center region.

3. The power line module of claim 1 wherein the power line module is removable and insertable to the power line outlet.

4. The power line module of claim 1 wherein the power line telecommunication signal comprises an Orthogonal Frequency-Division Multiplexing (OFDM) format; and wherein the bit rate is greater than about 200 Megabits per second.

5. The power line module of claim 1 wherein the first resistance of less than the first determined amount reduces a high frequency noise of 1 Mega Hertz and greater.

6. The power line module of claim 1 wherein the second resistance of less than the second determined amount reduces a high frequency noise of 1 Mega Hertz and greater.

7. The power line module of claim 1 wherein the plurality of first spring members comprise at least two spring members and the plurality of second spring members comprise at least two spring members.

8. The power line module of claim 1 wherein the plurality of first spring members comprise at least three spring members and the plurality of second spring members comprise at least three spring members.

9. The power line module of claim 1 wherein the plurality of first spring members and the plurality of second spring members are essentially spring steel material.

10. The power line module of claim 1 further comprising a network processor coupled to the power line chip.

11. The power line module of claim 1 wherein the first pin and the second pin have substantially no oxidation thereon.

12. A power line gateway device, the power line gateway device comprising:
    a housing;
    a power line module within a spatial region of the housing, the power line module comprising an input/output port, the power line module converting a power line telecommunication signal having a bit rate of greater than about 80 Megabits per second to an Ethernet signal;
    a coupling device coupled to the input/output port;
    a first pin comprising a plurality of first spring members operably coupled the coupling device, the first pin being insertable into a first site of a power outlet;
    a second pin comprising a plurality of second spring members operably coupled to the coupling device, the second pin being insertable into a second site of the power outlet;
    a first resistance of less than about a first determined amount between the first pin and the first site for reducing noise; and
    a second resistance of less than about a second determined amount between the second pin and the second site for reducing noise.

13. The power line gateway device of claim 12 wherein the plurality of first spring members comprise four spring members configured within a first center region; wherein the plurality of second spring members comprise four spring members configured within a second center region.

14. The power line gateway device of claim 12 wherein the power line telecommunication signal comprises an Orthogonal Frequency-Division Multiplexing (OFDM) format; and wherein the bit rate is greater than about 200 Megabits per second.

15. The power line gateway device of claim 12 wherein the first resistance of less than the first determined amount reduces a high frequency noise of 1 Mega Hertz and greater.

16. The power line gateway device of claim 12 wherein the second resistance of less than the second determined amount reduces a high frequency noise of 1 Mega Hertz and greater.

17. The power line gateway device of claim 12 wherein the plurality of first spring members comprise at least two spring members and the plurality of second spring members comprise at least two spring members.

18. The power line gateway device of claim 12 wherein the plurality of first spring members comprise at least three spring members and the plurality of second spring members comprise at least three spring members.

19. The power line gateway device of claim 12 wherein the plurality of first spring members and the plurality of second spring members are essentially spring material.

20. The power line gateway device of claim 12 further comprising a network processor coupled to the power line chip.

21. The power line gateway device of claim 12 further comprising:

a third pin comprising a plurality of third spring members operably coupled to the coupling device, the third pin being insertable into a third site of the power outlet; and a third resistance of less than about a third determined amount between the third pin and the third site.

* * * * *